United States Patent [19]

Evani et al.

[11] 4,156,775
[45] May 29, 1979

[54] QUATERNARY AMMONIUM SALTS OF EPIHALOHYDRIN POLYMERS AS ADDITIVES FOR FIBROUS MATERIALS

[75] Inventors: Syamalarao Evani; George R. Killat, both of Midland, Mich.

[73] Assignee: The Dow Chemical Company, Midland, Mich.

[21] Appl. No.: 652,599

[22] Filed: Jan. 26, 1976

[51] Int. Cl.$^2$ .................. C08G 65/32; C08G 65/24
[52] U.S. Cl. .................. 528/421; 162/164 EP; 252/8.8; 260/29.2 EP; 260/567.6 P; 528/404
[58] Field of Search .............. 260/2 A, 567.6 P, 2 BP, 260/9; 162/164; 528/421, 404

[56] References Cited

U.S. PATENT DOCUMENTS

| | | | |
|---|---|---|---|
| 3,428,680 | 2/1969 | Walker et al. | 260/567.6 |
| 3,625,684 | 12/1971 | Poot et al. | 96/1.5 |
| 3,640,766 | 2/1972 | Jursich et al. | 117/218 |
| 3,684,784 | 8/1972 | Marze | 260/80.3 N |
| 3,746,678 | 7/1973 | Dick et al. | 260/2A |
| 3,824,158 | 7/1974 | Rosenberg | 204/55 R |
| 3,864,288 | 2/1975 | Riew et al. | 260/2 A |

OTHER PUBLICATIONS

Dick et al., "Amine–Modified Polyalkylene Oxides", Chem. Abstracts 81, 106298r (1974).

*Primary Examiner*—Earl A. Nielsen

[57] ABSTRACT

Properties of fibrous materials, e.g., wet and dry strength of paper, are significantly improved by incorporating a cationic polyether into a fibrous material such as pulp. The polyether bears ammonium salt groups exemplified by the formula:

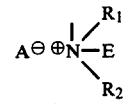

wherein $R_1$ and $R_2$ are individually hydrogen, hydrocarbyl such as alkyl, hydroxyhydrocarbyl, or hydrocarbylamino; E is individually

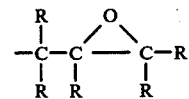

or E and $R_1$ are collectively

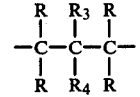

wherein R is hydrogen or alkyl, $R_3$ is hydroxyl, halogen, hydrogen or hydrocarbyl, $R_4$ is hydrogen or hydrocarbyl; and $A^\ominus$ is an anion of an ammonium salt. Such polyethers also function as retention aids for sizing agents and dyes and as antistatic agents.

8 Claims, No Drawings

QUATERNARY AMMONIUM SALTS OF EPIHALOHYDRIN POLYMERS AS ADDITIVES FOR FIBROUS MATERIALS

BACKGROUND OF THE INVENTION

This invention relates to water-soluble, thermally curable, cationic polyethers and to their use as additives in the manufacture of paper and other fibrous materials.

It is conventional to improve properties of paper such as wet strength, dry strength, etc. by adding certain polymers bearing quaternary ammonium salt groups. For example, U.S. Pat. No. 2,926,116 to Keim employs water-soluble, alkaline curable resins made by reacting epichlorohydrin with polyamides containing secondary amino groups. It is also known, e.g., U.S. Pat. No. 3,700,623 to Keim, to quaternize polymers of diallylamine with epichlorohydrin and then employ the resulting quaternized polymer as wet strength additives in the manufacture of paper. In the manufacture of most paper, it is desired to improve both wet strength and dry strength of the paper. In order to achieve improvement of both properties, molecular weight of the polymeric additive must be carefully controlled. Unfortunately, in the manufacture of aforementioned conventional polymeric additives, such control over molecular weight is very difficult to achieve.

In addition, many of the conventional wet strength additives are not brokable, thus recycling of scrap or waste paper that has been treated with these agents is severely restricted.

In view of the foregoing difficulties in the manufacture of wet and dry strength additives for paper, it would be highly desirable to provide a wet and dry strength additive for paper which is easier to prepare and has better properties than those of the prior art.

SUMMARY OF THE INVENTION

The present invention is, in one aspect, a novel, water soluble polymer having a predominantly polyalkyleneoxy backbone bearing groups comprising ammonium salt groups represented by the formula:

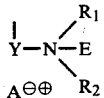

wherein each $R_1$ and $R_2$ are individually hydrogen, hydrocarbyl, hydroxyhydrocarbyl or aminohydrocarbyl wherein amino is a secondary or tertiary amino; each E is individually a monovalent hydrocarbon radical bearing an epoxy group or a group or groups capable of being converted to an epoxy group or E and $R_1$ are collectively a propylene or substituted propylene radical wherein the terminal carbon substituents are $C_1-C_3$ alkyl and the beta carbon substituents are hydroxy, halogen, hydrocarbyl or hydroxyhydrocarbyl; Y is alkylene including cycloalkylene and $A^\ominus$ represents any monovalent or polyvalent anion common to conventional ammonium salts. For purposes of this invention, the term "hydrocarbyl" is defined as a monovalent hydrocarbon radical such as alkyl, cycloalkyl, aryl, alkenyl and the like. The foregoing polymers, hereinafter called cationic polyethers, cure very quickly upon exposure to heat to form water-insoluble solids.

In another aspect, the present invention is a method for treating fibrous materials such as paper and textiles with the foregoing cationic polyethers to improve properties such as wet strength and dry strength in the case of paper and antistatic properties in the case of textiles.

In a further aspect, this invention is a fibrous material such as paper or textiles treated with the aforementioned cationic polyether.

In addition to the foregoing utilities, such cationic polyethers are also useful as retention aids for sizing agents and dyes.

DETAILED DESCRIPTION OF THE EMBODIMENTS

The cationic polyethers of the present invention are the homopolymers and copolymers of alkyleneoxy monomer units wherein the essential component is a repeating monomer unit represented by the formula:

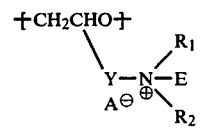

wherein E, $R_1$, $R_2$, Y and $A^\ominus$ are suitably as defined hereinbefore.

In especially preferred cationic polyethers, E and $R_1$ are collectively a propylene or substituted propylene radical represented by the formula:

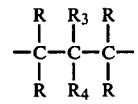

wherein R is hydrogen or $C_1-C_3$ alkyl, preferably two hydrogens or a hydrogen and an alkyl, especially methyl, per terminal carbon of the propylene radical; $R_3$ is hydrogen, hydroxyl, halogen or hydrocarbyl, preferably hydroxy, and $R_4$ is hydrogen or hydrocarbyl. In such preferred cationic polyethers, the propylene radical and the nitrogen form a four membered azetidinium ring represented by the formula:

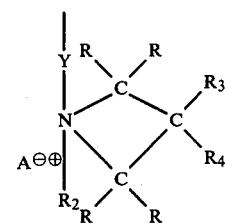

wherein Y, A and $R_2$ are as indicated hereinbefore. Preferably, $R_2$ is alkyl, hydroxyalkyl or aminoalkyl in which amino is a secondary or tertiary amine represented by the formula:

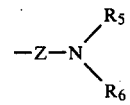

wherein Z is $C_2-C_6$ alkylene, $R_5$ is alkyl or hydroxyalkyl and $R_6$ is hydrogen, alkyl or hydroxyalkyl.

Also preferred are cationic polyethers in which the pendant ammonium salts can be converted to the azetidinium ring structure such as groups represented by the formula:

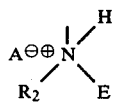

wherein A, $R_2$ and E are individually as defined hereinbefore. Preferably E is

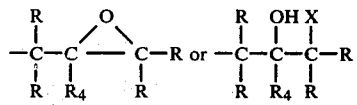

wherein each R is hydrogen or $C_1$-$C_3$ alkyl, especially methyl, and $R_4$ is as defined hereinbefore; $R_2$ is aminoalkyl, alkyl or hydroxyalkyl; and X is halogen such as bromine or chlorine, preferably chlorine.

In other suitable cationic ethers, the pendant ammonium salt groups are represented by the formula:

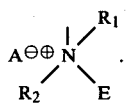

In such other cationic polyethers, E is

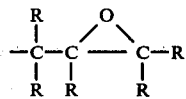

wherein each R is hydrogen or methyl, preferably hydrogen. Alternatively E is any monovalent organic radical having an epoxide group or a group convertible thereto, provided that the radical contains no other group that reacts with any portion of the cationic polyether. Exemplary suitable groups which may be converted to epoxide include halohydrin, aldehyde, ketone, alkene and similar groups that may be converted to epoxide without destroying the aminated polyether. Each $R_1$ and $R_2$ are individually hydrogen, alkyl, aminoalkyl wherein amino is a secondary or tertiary amine or hydroxyalkyl. Preferably $R_1$ and $R_2$ are alkyl, aminoalkyl or hydroxyalkyl, especially when alkyl has 1 to 4 carbon atoms, e.g., methyl and ethyl. $A^\ominus$ is an anion of an ammonimum salt, preferably chloride or bromide.

In the cationic polyethers, the aforementioned ammonium salt group must be present in sufficient concentration if the polyether is to function as an effective wet and dry strength additive for paper. For example, in preferred quaternized polyethers and the especially preferred quaternized polyethers containing the azetidinium ring, both having weight average molecular weights in the range from about 5,000 to about 60,000, the quaternary ammonium group should constitute at least 0.5, preferably from about 0.7 to about 1, milliequivalent (meq.) per monomeric unit of polyether to be effective. At higher molecular weights, e.g., up to 500,000, effective polyethers may contain as little as 0.05 meq. of the quaternary ammonium group per monomeric unit of polyether. At lower molecular weights, e.g., about 4,000, the quaternized polyether should contain more than 1 meq. of the quaternary ammonium group per monomer unit of the polyether. Similar amounts of suitable polyethers having pendant non-quaternary ammonium groups are also advantageously employed. Approximately the same or greater concentration of quaternary ammonium group is required for the quaternized polyether to function as an antistatic agent for textiles. Considered by itself, molecular weight of the cationic polyether is not particularly critical so long as the quaternized polyether is water-soluble prior to thermal curing and water-insoluble thereafter. As a general rule, cationic polyethers having a weight average molecular weight ($M_w$) as determined by gel permeation chromatography in the range from about 1,500 to about 500,000 are suitable, with those in the range from about 10,000 to about 60,000 being preferred.

The quaternized polyethers preferably employed are depicted in greater detail by the structural formula:

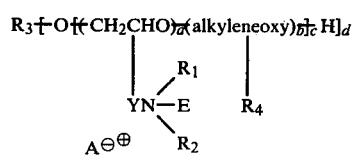

wherein E, $R_1$, $R_2$, Y and $A^\ominus$ are as indicated hereinbefore for preferred polyethers; alkyleneoxy contains 2 to 4 carbon atoms; $R_3$ is hydrogen or the residue of an active hydrogen initiator suitably employed in the polymerization of alkylene oxides and epihalohydrins and non-reactive with epoxy, amino or quaternary ammonium groups; each $R_4$ is hydrogen, alkyl, aryl, quaternary ammonium or similar monovalent organic radical that is non-reactive with epoxy, amino or quaternary ammonium groups; a, c and d are positive integers from 1 to 250 and b is 0 or a positive integer from 1 to 125 provided that the ratio of a to b is at least sufficient to provide 0.5 meq. of the ammonium salt group per monomeric unit of polyether. By the terminology "each $R_4$" is meant that in polyethers wherein b is 2 or more one $R_4$ may differ from another within the same polyether molecule. For example, a quaternized polyether having the following formula is contemplated:

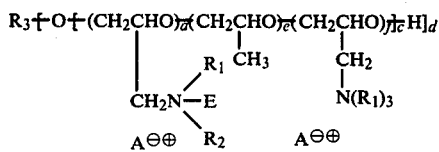

wherein $e + f = b$.

In especially preferred quaternized polyethers, the polyether backbone is as depicted hereinbefore for preferred quaternized polyethers, but the pendant quaternary ammonium groups are in the form of an azetidinyl ring represented by the formula:

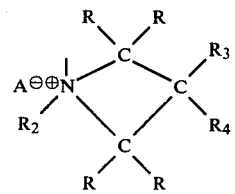

In this formula, R is most preferably hydrogen. $R_3$ is most preferably hydroxyl. $R_4$ is most preferably hydrogen. $R_2$ is $C_1$-$C_4$ alkyl or secondary or tertiary alkylamino, e.g., dialkylamino or alkylamino wherein alkyl is preferably methyl or ethyl. A is a suitable anion, preferably a monovalent anion, e.g., a halide such as chloride. Also especially preferred are polyethers bearing pendant ammonium groups that can be readily converted to an azetidinyl ring structure, e.g., ammonium groups represented by the formula:

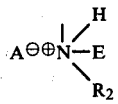

wherein A, $R_2$ and E are defined hereinbefore with E preferably being

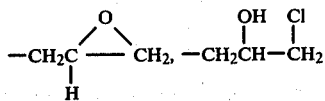

or the like. Such azetidinium polyethers are especially preferred because, in addition to being excellent wet and dry strength agents, papers treated with them are brokable. For the purposes of this invention, a paper is brokable if it can be recycled by reasonable means common to the paper industry through the pulp stage and to be reformed into paper that is comparable to paper made from virgin wood pulp (i.e., wood pulp that has not previously been in the form of paper). Such brokable characteristics are generally not possessed by papers treated with the other cationic polyethers of this invention.

In general, the quaternized polyethers of the present invention are most advantageously prepared by first polymerizing an epihalohydrin or copolymerizing the epihalohydrin with one or more alkylene oxides or similar alkyleneoxy compound, then reacting essentially all of the pendant haloalkyl groups with a secondary amine, primary amine or ammonia; and finally reacting the resulting pendant amine groups with epihalohydrin. Of course, in the preparation of the azetidinium polyethers, a polyether bearing pendant primary or secondary amine groups is reacted with epihalohydrin and the azetidinium ring is formed by subjecting the polymer to basic conditions of pH of 7 to 10, e.g., as described by Arnold Weissberger in *Heterocyclic Compounds with Three- and Four-Membered Rings*, Interscience Publishers, part two, p 891 (1964).

Examples of epihalohydrins useful in the polymerization and amine substitution steps are preferably epichlorohydrin, epibromohydrin and others represented by the structure:

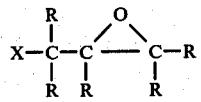

wherein X is chloro or bromo and R is hydrogen or methyl. Epichlorohydrin is especially preferred.

Examples of suitable alkylene oxides for use in copolymerization with epihalohydrin are the following: alkylene oxides, e.g., ethylene oxide, propylene oxide, 1,2-butylene oxide, 2,3-butylene oxide, isobutylene oxide and octylene oxide; glycidol; glycidyl ethers or thioethers, e.g., methyl glycidyl ether, allyl glycidyl ether, phenyl glycidyl ether, butylglycidyl ether, octylglycidylthioether and p-dodecylphenyl glycidyl ether; and others, e.g., tetrahydrofuran and trimethylene oxide.

In carrying out polymerization or copolymerization to prepare polyethers containing halomethyl side chains as described above, cyclic ether monomer (epoxides including epihalohydrin) or mixtures of cyclic ether monomers, the active hydrogen initiator and a Friedel-Crafts catalyst are preferably charged into a closed vessel and heated until polymerization is complete. In the case where a copolymer is being formed, the monomers, a prepolymer or mixture thereof may be charged simultaneously or consecutively or alternatively one or the other in whatever mole ratios are needed to form the desired product. Suitable polyethers and methods for preparing such polyethers are described in the following references which are incorporated herein by reference:

U.S.; 2,891,073
British; 898,306
U.S.; 3,058,921
U.S.; 2,599,799
U.S.; 2,871,219
U.S.; 3,158,580
U.S.; 3,058,923
U.S.; 3,065,188
U.S.; 3,331,788

The polyether is recovered in a conventional manner and pendant haloalkyl groups are aminated by contacting the polyether with ammonia; a primary amine such as methyl amine, ethyl amine, ethylene diamine; a secondary amine such as dimethyl amine, diethyl amine, dipropylamine, diethanol amine, preferably dimethyl amine. Conditions commonly employed in aminating alkyl halides, e.g., maintaining a reaction mixture of polyether and secondary amine dissolved in a non-reactive solvent such as acetonitrile, methanol, etc., at 75° C. in a closed vessel for up to 48 hours or more, are employed. Usually, amounts of amine which are stoichiometric or slightly in excess of the pendant haloalkyl groups of the polyether are employed. When less than stoichiometric amounts of the amine are employed, undesirable crosslinking of the polyether often occurs. Following amination, the aminated polyether is treated with chloride ion or similar anion to form the salt. Alternatively, the polyether may be aminated by the addition of the polyether to an excess of aminating agent in the absence of a solvent.

Finally, the aminated polyether is reacted with an epoxy compound such as epihalohydrin and the like. In reaction of the epoxy compound with the aminated polyether, it is desirable to employ an amount of epoxy compound that is, on a molar basis, at least equivalent to the amino groups of the polyether. It is preferred to carry out this reaction in a solvent. If a solvent system is used in the amine/polyether reaction, then the same solvent or water diluted solvent may be used in this reaction. Alcohols such as methanol are the preferred solvents in order to achieve high solids solutions. Sufficient solvent is added to just solubilize the aminated polyether and to permit easy stirring. This will generally result in a solution having 20 percent to 40 percent by weight of aminated polyether. Upon dissolution, the epihalohydrin is added. The reaction with epihalohydrin is preferably carried out at temperatures in the range from about 25° up to the boiling point of the solvent or about 100° C. The reaction is allowed to proceed to completion. In the preparation of the azetidinium polyethers, the presence of a neutralizing agent for acid such as sodium hydroxide, calcium carbonate, sodium carbonate, sodium bicarbonate, and the like promotes the formation of the azetidinium ring. Actual reaction conditions are given in more detail by Weissberger, supra.

The resulting cationic polyether is now ready for use as an additive in the manufacture of paper or in the manufacture of textiles.

In the manufacture of paper having improved wet and dry strength, the method of the present invention is practiced in the following manner: (1) an aqueous suspension of cellulosic fibers is formed; (2) the cationic polyether, advantageously in the form of a dilute aqueous solution is added to the suspension and is thereby absorbed onto the cellulosic fibers; and (3) the fibers are sheeted and dried using conventional procedures to form the desired cellulosic web.

The aqueous suspension of cellulosic fibers is formed in any conventional manner. Usually the fibers are beaten and refined, and the suspension is adjusted to a convenient consistency, advantageously from about 0.1 to about 6 weight percent fibers based on the weight of the suspension. Because of the strengthening characteristics of the cationic polyether, the amount of beating which is conventionally required can be reduced significantly.

The amount of polyether added is that which is effective to improve the wet strength of the resulting web of cellulosic fibers. Such amounts are preferably within the range from about 0.0005 to about 1, especially from about 0.25 to about 1, weight percent based weight of cellulosic fiber.

In the addition of the cationic polyether to the suspension of cellulosic fibers, a number of variations and techniques may be employed. It is critical, however, that all of the addition techniques employed achieve uniform dispersal of the polyether throughout the cellulosic fiber suspension in order to insure uniform absorption of the polyether by the fibers. The addition is therefore most effectively practiced by adding an aqueous solution containing from about 0.01 to about 50, preferably about 1, weight percent of the polyether to a turbulent stream of the fiber suspension at the headbox or other point near the web forming wire. It is suitable, however, to incorporate the polyether in the beater, hydropulper or stock chest. In the latter case, the stock is most advantageously agitated during the addition, and the solution of polyether is in rather dilute form. The pH of the fiber suspension may be any value between about 4.5 and about 9, preferably from about 6 to about 8.

In addition to the cationic polyether, conventional amounts of other additives such as pigments, fillers, stabilizers, retention aids, conventional wet strength additives and dry strength additives, sizing agents, and the like may be employed in combination with the cationic polyethers of the present invention. Such additives include kaolin clay, talc, titanium dioxide, calcium carbonate, diatomaceous earth, plastic pigments, aluminum trihydrate, and precipitated silica. Also it is found that the addition of various anionic polymers such as polyacrylic acid or partially hydrolyzed polyacrylamides further enhance the strengthening characteristics of the cationic polyether. Other anionic polymers suitably employed include the partially hydrolyzed Mannich product of polyacrylamide and the like. Preferably, the anionic polymer is a partially hydrolyzed polyacrylamide or partially hydrolyzed Mannich product thereof wherein the base polyacrylamide has a weight average molecular weight from 200,000 to 500,000 and from about 5 percent to about 25 percent of total amide groups are hydrolyzed to acid. When employed, such anionic polymers are used in amounts in the range from about 0.1 to about 1, preferably from about 0.4 to 0.7, meq. of anionic moiety of the anionic polymer per meq. of cationic moiety of the cationic polyether.

The cationic polyethers of this invention are most successfully utilized for the strengthening of paper prepared from all types of both cellulosic and combination of cellulosic with non-cellulosic fibers. The cellulosic fibers which may most advantageously be used include the bleached and unbleached sulfate (kraft), bleached and unbleached sulfite, bleached and unbleached soda, neutral sulfite, semi-chemical, chemi-ground wood, ground wood and any combination of these fibers. These designations refer to wood pulp fibers which have been prepared by means of a variety of processes which are known in the pulp and paper industries.

In applications wherein the cationic polyether is used as an antistatic agent for textile, the polyether is added to the textile fibers by any of several conventional methods. For example, the polyether dispersed in a liquid medium (preferably, an aqueous solution thereof) is suitably sprayed or brushed onto a fabric. Alternatively, the fabric may be immersed in a liquid dispersion of the polyether. Excess liquid dispersion can then be removed by heat, evaporation, passage of the impregnated fabric through squeeze rolls, any combination thereof or other well known means. It is also possible, although generally not as desirable, to coat the textile fibers while in a non-woven state. The cationic polyether is employed in an amount sufficient to impart a significant degree of electroconductive character to the textile. While specific amounts required to provide electroconductive character will vary with the kind of fiber, type of weave, etc., it is generally desirable to impregnate the textile, whether in fabric or non-woven form, with from about 0.25% to about 1%, preferably from about 0.5 weight percent of the cationic polyether based on the weight of the total impregnated textile. While amounts significantly in excess of the aforementioned upper limit generally improve dimension stability, the increase of textile weight would be unacceptable in most commercial applications.

Textiles most advantageously treated in accordance with this invention include blends of synthetic fibers such as nylon, polyolefin, polyester and the like with natural cellulosic fibers such as cotton, wool and the like. Preferred are the fiber blends containing at least 50 weight percent of one or more of the aforementioned cellulosic fibers.

The following examples are given to illustrate the embodiments of the invention and should not be construed as limiting its scope. In these examples, all parts and percentages are by weight unless otherwise indicated.

EXAMPLE 1

Preparation of Quaternized Polyether

An epichlorohydrin polymer having a weight average molecular weight of 26,000 as determined by gel permeation chromatography is prepared by reacting in the presence of water and boron trifluoride 91 parts of epichlorohydrin with 9 parts of diglycidyl ether of bisphenol-A having an epoxide equivalent weight of 172–178. A 25 percent solution of the resulting polymer is made by dissolving same in acetonitrile at 25° C. The solution is cooled to 0° C. and anhydrous dimethylamine (three equivalents of amine per equivalent of chloromethyl group) is added to the solution in a pressure tube (10" × 1" O.D.). The pressure tube is capped and allowed to react for 48 hours at 75° C. Infrared analysis of the polymer, at this point, shows no chloromethyl group remaining. Also, ionic chloride titration shows 100 percent of the theoretical chloride has been converted from organic to ionic chloride. The polymer is then devolatilized and redissolved in deionized water. The water solution is passed through an anion exchange resin. The exiting solution contains less than 5 percent of initial amine chloride. Alternatively the epichlorohydrin polymer is aminated by mixing one equivalent of dimethylamine per chloromethyl group of the polymer and heating the resulting mixture at 75° C. for 48 hours in acetonitrile. The resulting aminated polymer is neutralized with alcoholic NaOH (10%) and the NaCl is filtered off. Amination by this procedure eliminates the necessity of using ion exchange resins. Epichlorohydrin (1.5 equivalents of epichlorohydrin per equivalent of amine) is added to a 20 percent solution of the polymer in methanol and the mixture is agitated for 48 hours at 25° C. Ionic chloride titration, at this point, indicates greater than 95 percent quaternization of the amine group by epichlorohydrin. The resultant stock solution has a total active solids of 29 percent (calculated). A 1 percent aqueous solution of the aforementioned quaternized polyether having a weight average molecular weight of approximately 52,000 is made by diluting 1 gram of the stock solution (29 percent solids) with 28 grams of deionized water.

Treated Handsheet Preparation

A 1.0 percent slurry of bleached hardwood/softwood kraft (50/50) pulp is prepared in tap water, and the pH of the resulting slurry is adjusted to 7.0. Deionized water containing 150 ppm $CaCO_3$ as hardness is used for dilution. The 1.0 percent aqueous solution of quaternized polyether is added to a 1.0 liter sample of the pulp slurry (5 cc of the 1.0 percent solution = 10 lbs./ton of pulp) and the slurry sample is mixed for one minute. The sample is then added to 7.5 liters of the deionized water containing 150 ppm $CaCO_3$ and mixed in the proportionator section of the Noble and Wood apparatus. A 2-liter sample is taken from the proportionator and added to 10 liters of deionized water in the headbox section. Three handsheets (2.5 gram) are made from the slurry sample using a Noble and Wood handsheet mold (8" × 8"). The handsheets are dried on a Noble and Wood drier at 208° F. to give an average of 4–4.5 percent moisture content on the sheets. One half of the handsheets are cured at 85° C. for 30 minutes in an oven. The resulting cured and remaining uncured handsheets are tested for strength and the results are reported as burst values in Table I. Some of the handsheets are tested for water absorbency and the results are recorded in Table I.

For the purpose of comparison, several structurally related, wet strength additives (Sample Nos. $A_1$–$A_6$) are similarly tested and the results are also recorded in Table I.

EXAMPLE 2

In a manner similar to Example 1, a quaternized polyether having a weight average molecular weight ($M_w$) of ~4,000 is prepared from a polyether having a $M_w$ of 2,000. The resulting quaternized polyether has quaternized repeating units (mers) represented by the formula:

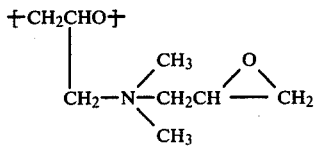

The quaternized polyether is similarly added to paper pulp, and the resulting pulp mixture is formed into handsheets which are tested for wet strength. The results of these tests are also recorded in Table I.

EXAMPLE 3

A 25 percent solution of the epichlorohydrin polymer described in Example 1 is made by dissolving the polymer (6.0 g.) in acetonitrile (18.0 g.) at 25° C. Ethylamine (8.34 g. of a 70% aqueous solution of ethylamine) is added to the polymer solution in the proportion of 2.2 eq. of ethylamine/eq. of polyepichlorohydrin. The mixture is placed in a pressure tube as in Example 1 and heated at 75° C. for 54 hours. Ionic chloride titration shows 99.5% of the organic chloride has been converted to ionic chloride. Methanolic NaOH (10%) is added to the resulting reaction mixture in proportion of one eq. of NaOH/eq. of ionic chloride. NaCl is precipitated and the polymeric solution filtered as a 18.5% solids solution in methyl alcohol.

This methanolic solution (3.0 g.) is mixed with deionized water (1.62 g.). An 0.46 g. portion of epichlorohydrin in proportions of 1 eq./eq. of amine is added to the polymer solution at 25° C., and the resulting mixture is allowed to react at 25° C. for 48 hours. Analysis of the resulting reaction mixture shows complete disappearance of epoxy groups thereby indicating the polyether bears pendant azetidinium groups represented by the formula:

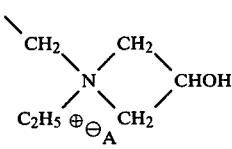

wherein the counterion, $A^\ominus$, is chloride ion. This polyether is added to paper pulp and formed into handsheets as in Example 1. The handsheets are tested for wet strength, and brokability, and the results are recorded in Table I.

EXAMPLE 4

The epichlorohydrin polymer (29.0 g.) described in Example 2 is added to 150 g. of ethylene diamine at 80° C. and allowed to react for 1 hour with agitation under $N_2$. At this point, ionic chloride titration shows >98% conversion of organic chloride to ionic chloride. Alcoholic NaOH (10%) is added to neutralize the acid formed (one eq. NaOH/eq. ionic chloride). The NaCl is precipitated and the polymer solution devolatilized to remove excess ethylene diamine. The recovered polymer (19.32 g.) is dissolved with 262.24 g. of H₂O, and the solution is heated to 60° C. under N₂ with agitation. Epichlorohydrin (46.23 g.) is added to the aqueous polymer solution in the proportion of 3 eq. epichlorohydrin of reacted ethylene diamine, and allowed to react for 1 hour. Analysis of the resulting mixture shows complete disappearance of epoxy groups. Measurement of percent solids indicates the reaction of two equivalents of epichlorohydrin per equivalent of diamine. Accordingly, it is concluded that polyether bears pendant azetidinium groups represented by the formula:

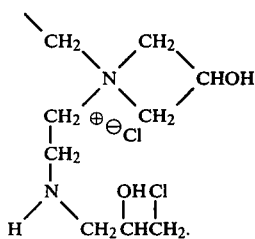

This polyether is added to paper pulp and formed into handsheets as in Example 1. The handsheets are tested for wet strength, absorbency and brokability. The results are recorded in Table I.

paper treated with a standard wet strength additive (Sample Nos. $A_1$–$A_4$). Such papers of the present invention that are treated with polyethers bearing pendant azetidinium groups (Sample Nos. 8–10) are generally more brokable than papers treated with standard wet strength additives. In addition, the quaternized polyethers are observed to develop wet strength at a much faster rate or at lower temperatures than the standard wet strength additives. The quaternized polyethers possess more superior absorbency characteristics than a quaternized polymer having a polyethylenic backbone.

EXAMPLE 5

Using the quaternized polyethers of Examples 1 and 4 and general procedure of Example 1, several pulp formulations are prepared in which an anionic polymer as specified in Table II is added along with the quaternized polyether. Handsheets are formed and tested for wet strength as in Example 1. The results are recorded in Table II.

For the purposes of comparison, the foregoing procedure is repeated except that a standard wet strength additive as indicated in Table II is substituted for the quaternized polyether.

TABLE I

| Sample No. | Wet Strength Additive(1) Type | Amount, lb/ton | Wet Burst(2), lb./in² Uncured | Cured | Absorbency(3) sec. | Dry Burst(2) lb./in² Uncured | Cured | Rebroke(4) |
|---|---|---|---|---|---|---|---|---|
| 1 | P/Epi(a) | 5 | 6.5 | 7.9 | ND** | ND | ND | DR |
| 2 | P/Epi(a) | 10 | 13.7 | 16.2 | ND** | 49.7 | 50.0 | DR |
| 3 | P/Epi(a) | 15 | 18.3 | 21.3 | 23.5 | ND | ND | DR |
| 4 | P/Epi(a) | 20 | ND | ND | ND | 52.9 | 56.0 | DR |
| 5 | P/Epi(b) | 5 | 1.9 | 3.3 | 34.0 | ND | ND | ND |
| 6 | P/Epi(b) | 10 | 5.4 | 8.0 | 33.0 | ND | ND | ND |
| 7 | P/Epi(b) | 15 | 9.5 | 12.1 | 34.0 | ND | ND | ND |
| 8 | P/Epi(c) | 10 | 6.5 | 12.7 | ND | ND | ND | 1.1 |
| 9 | P/Epi(d) | 5 | 5.3 | 12.3 | 17.0 | ND | ND | 0.8 |
| 10 | P/Epi(d) | 10 | 7.6 | 15.6 | 19.9 | ND | ND | 0.8 |
| 11 | P/Epi(d) | 15 | 8.0 | 17.3 | 21.9 | ND | ND | 0.9 |
| $A_1$* | Kym(j) | 5 | 4.2 | 9.5 | ND | ND | ND | 1.0 |
| $A_2$* | Kym(j) | 10 | 7.3 | 13.4 | ND | 44.6 | 47.7 | 1.0 |
| $A_3$* | Kym(j) | 15 | 10.2 | 16.0 | 18.1 | ND | ND | 1.0 |
| $A_4$* | Kym(j) | 20 | ND | ND | ND | 46.1 | 52.7 | 1.0 |
| $A_5$* | S/MA(k) | 15 | 12.1 | 19.1 | 95 | ND | ND | ND |
| $A_6$* | IB/MA(l) | 15 | 13.7 | 19.8 | 117 | ND | ND | ND |

*Not an example of the invention.
**ND - Not determined
(1) (a)P/EPi - quaternized polyether described in Example 1.
(b)P/Epi - quaternized polyether described in Example 2.
(c)P/Epi - quaternized polyether described in Example 3.
(d)P/Epi - quaternized polyether described in Example 4.
(j)Kym - Polyamide polyamine sold under tradename Kymene 557® by Hercules, Inc.
(k)S/MA - Styrene/maleic anhydride (50/50) copolymer which has been reacted first with N,N-dimethylaminopropylamine, $(CH_3)_2NCH_2CH_2CH_2NH_2$ to convert all anhydride groups to imide groups and then with epichlorohydrin to quaternize about 95 percent of the tertiary amine groups.
(l)IB/MA - Isobutylene/maleic anhydride copolymer (50/50) copolymer which is quaternized by the same procedure used for the preceding styrene/maleic anhydride copolymer.
(2)Test procedure of TAPPI T403 ts-65 and values calculated according to TAPPI T220 m-60.
(3)TAPPI T432 ts-64 with the water droplet being applied from a burette 2 cm. away from the handsheet rather than directly to the handsheet. The lower the number the more preferred absorbency characteristic.
(4)A 2.5 g. portion of paper (8" × 8") which contains wet strength additive is cut into 1" squares and soaked in 500 ml. of water for 5 min. The paper is then subjected to a high speed shearing action with a Waring Blender for a period of time (20–40 sec.). A handsheet is formed from the resulting slurry on a Noble and Wood handsheet machine and then pressed and dried. The dried sheet is then compared with a series of standard sheets exhibiting various degrees of rebroking. The time required to obtain a given degree of rebroking is compared with the time required to obtain the same level of a standard sheet treated with Kym [1(j)] and having the same level of wet strength. The rebroking number is then determined by the following equation:

$$\text{Rebroke} = \frac{\text{time to rebroke sample paper (sec.)}}{\text{time to rebroke Kym paper (sec.)}}$$

As evidenced by the data listed in Table I, paper treated with the quaternized polyethers of the present invention exhibit wet strengths and dry strengths that are generally superior and dry strengths that are generally equivalent to or better than similar properties of

TABLE II

| Sample No. | Wet Strength Additive Type | Amount, lb/ton | Anionic Polymer Additive Type | Amount, lb/ton | Wet Burst(2), lb/in² Uncured | Cured |
|---|---|---|---|---|---|---|
| 1 | P/Epi(a) | 5 | P/AAM(y) | 2.5 | 9.8 | 14.6 |

TABLE II-continued

| Sample No. | Wet Strength Additive Type | Amount, lb/ton | Anionic Polymer Additive Type | Amount, lb/ton | Wet Burst(2), lb/in² Uncured | Cured |
|---|---|---|---|---|---|---|
| 2 | P/Epi(a) | 10 | | 5.0 | 15.0 | 20.4 |
| 3 | P/Epi(a) | 15 | | 7.5 | 15.8 | 21.9 |
| 4 | P/Epi(d) | 5 | | 0 | 5.3 | 12.3 |
| 5 | P/Epi(d) | 10 | | 0 | 7.6 | 15.6 |
| 6 | P/Epi(d) | 15 | | 0 | 8.0 | 17.6 |
| 7 | P/Epi(d) | 10 | P/AAM(y) | 5.0 | 13 | 19.2 |
| 8 | P/Epi(d) | 10 | Mp(z) | 5.0 | 12.6 | 19.0 |
| 9 | P/Epi(d) | 9 | Mp(z) | 1.0 | 8.6 | 16.0 |
| A₁* | Kym(j) | 5 | | 0 | 4.2 | 9.5 |
| A₂* | Kym(j) | 10 | | 0 | 7.3 | 13.4 |
| A₃* | Kym(j) | 15 | | 0 | 10.2 | 16.0 |
| A₄* | Kym(j) | 10 | P/AAM(y) | 5.0 | 12.4 | 18.6 |
| A₅* | Kym(j) | 10 | MP(z) | 5.0 | 12.0 | 18.0 |

*Not an example of the invention.
(a), (d), (j) - Same as in Table I.
(y)P/AAM - Polyacrylamide having a $M_w$ of ~250,000 with 6-12 mole % of amide groups being hydrolyzed to acid.
(z)MP - hydrolyzed Mannich product of polyacrylamide having a $M_w$ of ~250,000 with 6-12 mole % of the amide groups being hydrolyzed to acid and about 20 mole % of the amide groups being converted to Mannich group via the reaction of the amide group with formaldehyde and dimethyl amine.

What is claimed is:

1. A cationic polyether bearing pendant ammonium salt groups, said polyether having repeating monomeric units represented by the formula:

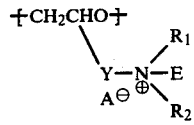

wherein each $R_1$ is individually hydrogen and each $R_2$ is individually hydrogen, hydrocarbyl, hydroxyhydrocarbyl or aminohydrocarbyl wherein amino is a secondary or tertiary amino; each E is individually a monovalent hydrocarbon radical bearing an epoxy group or a group or groups capable of being converted to an epoxy group or E and $R_1$ are collectively a propylene or substituted propylene radical wherein the terminal substituents are $C_1$-$C_3$ alkyl and the β-carbon substituents are hydroxy, halogen, hydrocarbyl, or hydroxyhydrocarbyl; Y is alkylene and $A^\ominus$ represents any anion common to conventional ammonium salts.

2. The polyether of claim 1 having a weight average molecular weight in the range from about 4,000 to about 500,000.

3. The polyether of claim 1 represented by the structure:

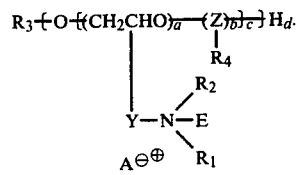

wherein z is alkyleneoxy $R_3$ is hydrogen or the residue of an active hydrogen initiator, each $R_4$ is hydrogen, alkyl, aryl or tertiary amino, a, c and d are positive integers from 1 to 250, b is 0 or a positive integer from 1 to 125 provided a is at least as large as b.

4. The polyether of claim 1 wherein the polyether is represented by the formula

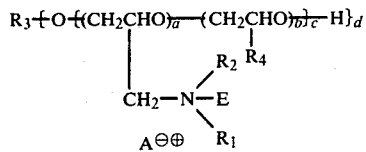

wherein $R_3$ is hydrogen or the residue of an active hydrogen initiator, each $R_4$ is hydrogen, alkyl, aryl or tertiary amino, a, c and d are positive integers from 1 to 250, b is 0 or a positive integer from 1 to 125 provided a is at least as large as b.

5. The polyether of claim 4 wherein E and $R_1$ are collectively a propylene or substituted propylene radical represented by the formula:

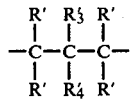

wherein R' is a hydrogen or $C_1$-$C_3$ alkyl, $R_3'$ is hydrogen or hydroxyl and $R_4'$ is hydrogen.

6. The polyether of claim 2 wherein E is represented by the formula

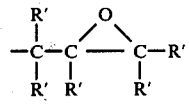

with each R' being hydrogen or methyl.

7. The polyether of claim 2 wherein E and $R_1$ are collectively a propylene or substituted propylene radical represented by the formula:

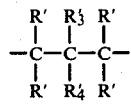

wherein R' is hydrogen or $C_1$-$C_3$ alkyl, $R_3'$ is hydrogen, hydroxyl, halogen or hydrocarbyl and $R_4'$ is hydrogen or hydrocarbyl.

8. The polyether of claim 1 bearing pendant epoxy groups represented by one of the following formulas:

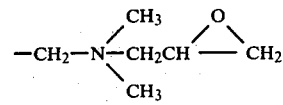

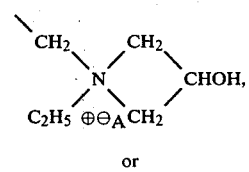

or

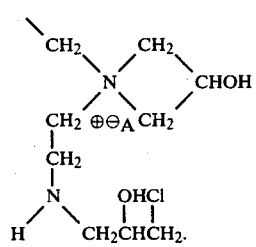

* * * * *